United States Patent [19]

Kroplinski et al.

[11] 4,256,617

[45] Mar. 17, 1981

[54] CATALYZED NON-TOXIC POLYURETHANE FORMING COMPOSITIONS AND SEPARATORY DEVICES EMPLOYING THE SAME

[75] Inventors: Thaddeus F. Kroplinski, Old Bridge; Barton C. Case, Hightstown, both of N.J.

[73] Assignee: NL Industries, Inc., New York, N.Y.

[21] Appl. No.: 90,206

[22] Filed: Nov. 1, 1979

[51] Int. Cl.³ .............................................. C08G 18/16
[52] U.S. Cl. ............................. 260/18 TN; 210/500.2; 528/49
[58] Field of Search ................... 260/18 TN; 528/49; 210/321 R, 321 A, 321 B

[56] References Cited

U.S. PATENT DOCUMENTS

| | | | |
|---|---|---|---|
| 2,972,349 | 2/1961 | Wall | 261/94 |
| 3,228,876 | 1/1966 | Mahon | 424/88 |
| 3,228,877 | 1/1966 | Mahon | 264/176 F |
| 3,339,341 | 9/1967 | Maxwell et al. | 55/16 |
| 3,422,008 | 1/1969 | McLain | 55/16 |
| 3,423,491 | 1/1969 | McLain et al. | 264/49 |
| 3,492,698 | 2/1970 | Geary et al. | 425/117 |
| 3,503,515 | 3/1970 | Tomsic | 210/321 |
| 3,551,331 | 12/1970 | Cescon et al. | 264/41 |
| 3,879,293 | 4/1975 | Wolf et al. | 210/350 |
| 3,907,687 | 9/1975 | Hoeltzenbein | 264/258 |
| 3,925,037 | 12/1975 | Ward et al. | 55/158 |
| 3,962,094 | 6/1976 | Davis et al. | 210/321 |
| 4,031,012 | 6/1977 | Gics | 210/321 B |

*Primary Examiner*—Maurice J. Welsh
*Attorney, Agent, or Firm*—Gary M. Nath

[57] ABSTRACT

The present invention is directed to improvements in non-toxic polyurethane compositions and separatory devices employing the same, such as hollow fiber separatory devices intended to be used in biomedical applications. The separatory device employs at least one separatory membrane suitable for the intended end use application which is secured, potted or sealed in a housing using a cured flexible polyurethane composition. The improvement in the polyurethane composition employed in the separatory device is achieved by reacting at least one NCO-terminated prepolymer and at least one polyol in the presence of a ricinoleic acid reactive catalyst. The catalyst reduces the curing time of the polyurethane resin and because it is sufficiently reactive with the NCO-terminated prepolymer, it is incorporated into the structure of the polyurethane and cannot be released during operation of the separatory device.

11 Claims, No Drawings

CATALYZED NON-TOXIC POLYURETHANE FORMING COMPOSITIONS AND SEPARATORY DEVICES EMPLOYING THE SAME

BACKGROUND OF THE INVENTION

Separatory devices useful in biomedical applications such as kidney dialysis, heomodialysis, hemoultrafiltration, blood oxygenation and the like are well known. Such devices generally consist of at least one separatory membrane or element, disposed in a housing or casing having an inlet and an outlet means. The separatory membrane may take the form of a hollow fiber, film, screen, and the like and is chosen for its ability to perform the intended biomedical function.

While various methods of manufacture have been described, certain of such methods employ potting or sealing resins to secure the separatory membranes in the housing and prevent the mixing of fluids which pass on either side of the membrane when necessary.

The choice of suitable potting resins is limited by the fact that they must be non-toxic during operation of the separatory device. As used herein the terms non-toxic is intended to characterize a potting resin which when incorporated into a separatory device does not contain toxic components which are releasable into the fluids which pass through the separatory device as determined by the Hemolysis test described herein. While non-toxic potting resins are known they possess certain deficiencies which can best be illustrated with reference to separatory devices which employ hollow fibers.

Such devices typically consist of a plurality of permeable hollow fibers whose terminal portions are potted in a sealing collar and extend therethrough thereby providing liquid access to the interior of the fibers.

The separatory elements are then typically sealed within a casing to form a separatory cell having one or more liquid ports which allow for the passage of one fluid, such as blood, through the fibers and another fluid around the fibers without mixing the two fluids. The separatory element may have two sealing collars or a single sealing collar in which latter case the fibers are doubled back so that all the ends terminate together. The general configuration of the separatory element and separatory cell is similar to a tube-and-shell heat exchanger.

Patents representative of the art of hollow fiber separatory devices include U.S. Pat. Nos. 2,972,349, 3,228,876, 3,228,877, 3,422,008, 3,423,491, 3,339,341, 3,503,515, 3,551,331 and the like the disclosures of which are herein incorporated by reference.

The sealing collar is typically derived from a resin which is capable of encapsulating the fibers to provide a seal which prevents the fluid inside the hollow fibers from mixing with the fluid outside the fibers.

A preferred class of resins useful for preparing the sealing collars are flexible polyurethane forming systems as illustrated by U.S. Pat. Nos. 3,962,094 and 4,031,012 the disclosures of which are herein incorporated by reference. Centrifugal casting, as illustrated by U.S. Pat. No. 3,492,698, the disclosure of which is herein incorporated by reference, is a representative method employed for preparing sealing collars. In accordance with such a technique, a holding device containing a bundle of fibers arranged in a parallel configuration is placed into a centrifugal-like device which incorporates a potting-material reservoir with tubes connecting it to end-molds. An appropriate resin is placed into the potting reservoir maintained at an appropriate temperature. The entire assembly is then rotated to force the resin down the connecting tubes by the centrifugal force. The resin thereby flows around and among the fibers in the end-molds. The rotation is continued until the resin gels. When polyurethanes are employed as the resin, typical residence time in the centrifuge can vary from about 1 to about 8 hours at room temperature. When rotation is completed the resin impregnated fiber bundle is removed and post cured. The end molds are then removed and the fiber ends are opened by cutting through the resin collar perpendicular to the fiber bundle.

Other sealing collar forming techniques rely on the force of gravity to force the resin into a mold containing the ends of the hollow fibers. The resin is allowed to gel and then is post cured.

Regardless of the particular method employed for preparing the sealing collar the polyurethanes typically employed therein exhibit extended gel and demold, i.e., post cure, times.

The same polyurethane resins that are employed in preparing hollow fiber separatory devices are used to perform similar functions in other separatory devices wherein a separatory membrane is provided in a configuration different from that of hollow fibers. Thus, while the configuration of the separatory membranes differ in commercially available separatory devices, the problems of extended cure times are common to all.

Catalysts are known that are specific for increasing the hydroxyl-isocyanate reaction rate such as aliphatic and cycloaliphatic tertiary amines, and soluble metal compounds, particularly organotin compounds.

The selection of a suitable catalyst for use in a polyurethane system intended as a potting resin for a biomedical device is complicated by the requirement that the resin system be non-toxic. Thus, the aliphatic and cycloaliphatic tertiary amines are unsuitable because of their toxicity. Although tin-octoate has been used as a catalyst and is non-toxic it is hydrolytically unstable and must be added to the polyol on site rather than during packaging of the polyol. Ferric acetyl acetonate can also be used as a catalyst but it is toxic at levels of about 0.1% by weight and higher and imparts a dark red color to the polyurethane.

The hydroxyl-isocyanate reaction rate of polyurethane forming systems is also known to be slightly increased by strong acids as illustrated by J. Saunders and K. Frisch, *Polyurethanes, Chemistry and Technology* at 211–15 (1962).

However, acids in general are very toxic when introduced into the blood stream and their residual presence in potting resins used in preparing biomedical devices has heretofore been avoided because of the risk that they will be absorbed into the fluids passing through the device.

The search has therefore continued for a polyurethane composition, and separatory devices employing the same which are non-toxic, and which can be prepared in a more cost efficient manner than has heretofore been possible. The present invention is a result of this search.

SUMMARY OF THE INVENTION

In one aspect of the present invention there is provided an improvement in a two component polyurethane forming composition which is non-toxic when cured and employed as a potting agent in a separatory device capable of use in a biomedical application. The first component of the polyurethane forming composition comprises at least one NCO-terminated prepolymer and the second component comprises at least one polypol. The improvement comprises including an effective catalytic amount of a ricinoleic acid into the second component.

In another aspect of the present invention there is provided an improvement in a process for preparing a separatory device capable of use in a biomedical application wherein a portion of at least one separatory membrane is secured in a housing using a non-toxic flexible cured polyurethane composition by reacting a first component comprising at least one NCO-terminated prepolymer with a second component comprising at least one polyol. The improvement comprises reacting the NCO-terminated prepolymer with the polyol in the presence of an effective catalytic amount of ricinoleic acid.

In still another aspect of the present invention there is provided an improved separatory device capable of use in a biomedical application wherein at least one separatory membrane is secured in a housing in a manner sufficient to perform the selected biomedical function using a non-toxic cured polyurethane composition provided by reacting a first component comprising an NCO-terminated prepolymer with a second component comprising at least one polyol. The improvement comprises using as the non-toxic polyurethane composition at least one of said NCO-terminated prepolymers of the first component reacted with at least one of said polyols of the second component in the presence of an effective catalytic amount of ricinoleic acid.

DESCRIPTION OF THE PREFERRED EMBODIMENTS

The separatory devices of the present invention embody a catalyzed polyurethane composition which is non-toxic and more economical to use in separatory devices than the polyurethanes of the prior art.

More specifically, the polyurethane composition is provided from a two component system which employs a ricinoleic acid catalyst.

Two component polyurethane forming systems are well known in the art and typically comprise as a first component an NCO-terminated prepolymer and as a second component a polyfunctional alcohol, i.e., polyol. The hydroxyl groups of the polyol react with the NCO groups of the NCO-terminated prepolymer to form a polyurethane.

The ricinoleic acid catalyst, which possesses a hydroxyl group, in addition to a carboxylic acid group, inparts unique properties when utilized in a polyurethane potting composition for separatory device preparations. Not only does the ricinoleic acid provide catalytic activity by virtue of its carboxylic group, it also has a more reactive hydrogen containing hydroxyl group which reacts quickly and completely with the NCO terminated prepolymer. Before the carboxylic group reacts, however, it provides a sufficient catalytic effect to increase the cure rate of the polyurethane to the extent that the gel and demold time is reduced substantially. Apparently this renders the polyurethane composition non-toxic whereas carboxylic and dicarboxylic acids are not sufficiently reactive with isocyanate and they yield compositions which remain toxic. Consequently, the ricinoleic acid cannot be replaced into the fluids which pass through the separatory device and the unreacted carboxylic acid can.

The requirements of a cured polyurethane when used as a potting resin in a separatory device, e.g., in preparing the sealing collars employed in hollow fiber separator devices, are well known. For example, it must possess the proper balance between crosslinked density, flexibility and bonding properties so that the intended sealing effect is achieved, e.g., the interior of the portions of the hollow fibers embedded therein are capable of being hermetically sealed off from the external environment. The polyurethane preferably exhibits avoidance of gas evolution during solidification, minimum or no change in volume during cure, minimal evolution of heat during cure, and low mix viscosity.

In addition, the polyurethane must also be inert to the fluids employed in the separatory device and non-toxic. This is achieved when the ingredients in the two components are completely cured so that residual reactants cannot be released into the fluids which will pass through the separatory device.

The NCO-terminated prepolymer of flexible polyurethanes is formed from the reaction product of a polyfunctional alcohol and a polyfunctional isocyanate. The proper selection of reactants to achieve a polyurethane for use in a biomedical device is well within the skill in the art, as illustrated by U.S. Pat. No. 3,962,094 which has already been incorporated by reference, when guided by the above requirements described herein for the polyurethane. Thus, representative examples of the polyisocyanates which may be employed in the preparation of the NCO-terminated prepolymer include aromatic isocyanates as illustrated by the di- and tri- isocyanates of the benzene and naphthalene series and mixtures thereof. Illustrative of aromatic isocyanates that may be employed include diphenylmethane 4,4'-diisocyanate; tolylene diisocyanate (2,4/2,6); toluene 2,4-diisocyanate; toluene 2,6-diisocyanate; m-phenylene diisocyanate; xenylene 4,4'-diisocyanate; naphthalene 1,5-diisocyanate; diphenylene 4,4'-diisocyanate; diphenylene ether 4,4'-diisocyanate and 4,4',4"-triphenylmethane triisocyanate. Polymeric isocyanates such as polymethylene polyphenylene polyisocyanates can be employed when the absence of color is not a requirement. Other aromatic diisocyanates which are useful include lower alkyl substituted derivatives, and alkoxy derivatives.

Aliphatic diisocyanates such as 3-isocyanatomethyl-3, 5,5-trimethylcyclohexylisocyanate (IPDI), 4,4'-dicyclohexylmethane diisocyanate, and trimethyl hexamethylene diisocyanate, may also be used. Other aromatic and aliphatic isocyanates as well as mixtures, may also be used in the prepolyer preparation.

Representative polyols used to react with the isocyanates to form the NCO-terminated prepolyer include castor oil, polyether (i.e., hydroxy terminated) including the adducts of propylene oxide and at least one polyol, the latter being illustrated by propylene glycol, trimethyl propane, 1,2,6-hexane triol, glycerine and pentaerythritol; and polytetramethylene ether glycols.

Commercial grades of castor oil are generally suitable herein for use in the prepolymer formation. Castor oil is a naturally occurring triglyceride of ricinoleic acid and thus contains at least three hydroxy groups. While the composition of castor oil cannot be precisely defined, it is generally accepted that its ester groups are usually 80–92% ricinoleic, 3–7% linoleic, 0–9% oleic and 0–1% palmitic.

Polyol esters derived by reacting dihydric lower aliphatic polyols with aliphatic dicarboxylic acids, anhydrides, or hydroxy carboxylic acids are also suitable for preparing the prepolymer. Representative examples of aliphatic dihydric alcohols suitable for preparing polyol esters include ethylene glycol, propylene glycol, hexylene glycol, diethylene glycol, dipropylene glycol, and hexamethylene glycol. The hydroxy carboxylic acids suitable for preparing polyol esters may be saturated or unsaturated. Illustrative of this class of hydroxy acids include ricinoleic acid, 12-hydroxy stearic acid, hydroxy palmitic acid, hydroxy pentadecanoic acid, hydroxy myristic acid, hydroxy docosanoic acid, hydroxy cerotic acid, etc. Illustrative of aliphatic carboxylic acids include adipic, glutaric, pimelic, malonic, fumaric acids and the like.

The preferred polyol esters are derived from ricinoleic acid such as ethylene glycol monoricinoleate.

The isocyanate and polyol typically are reacted at NCO/OH equivalent weight ratio of from about 2:1 to about 12:1, and preferably from about 4:1 to about 7:1.

Polyols useful in the second component of the polyurethane forming system include the difunctionaly polyols and particularly the polyether and polyol esters described in connection with the formation of the NCO-terminated prepolymer. In addition crosslinking agents are employed with an hydroxyl functionality of greater than 2.

Such crosslinking agents are illustrated by polyols which include castor oil in the polymerized and unpolymerized form, glycerine, trimethyol propane, 1,2,6-hexanetriol, and pentaerythritol; polyether polyols including the adducts of propylene oxide and any of the above crosslinking polyols; polyol esters including the adducts of the carboxyolic acids, hydroxy carboxylic acid, or anhydride derivatives described in connection with the prepolymer and any of the crosslinking polyols described above.

The preferred NCO-terminated prepolymers are derived from the reaction product of a mixture of polyoxypropylene glycol and castor oil with (1) diphenylmethane 4,4'-diisocyanate (MDI), or (2) a mixture of MDI with 3-isocyanatomethyl-3,5,5-trimethylcyclohexylisocyanate.

The preferred polyols employed in the polyol component in conjunction with the preferred NCO-terminated prepolymers include (1) mixtures of trimethylol propane diricinoleate and ethylene glycol monoricinoleate; and (2) mixtures of ethylene glycol monoricinoleate and polymerized castor oil.

Polymerized castor oil is the product which results from controlled oxidation of castor oil conducted by intimate mixing or blowing of air or oxygen into the castor oil at temperatures between about 80 and 130°C, with or without the use of a catalyst. The reaction between the oxygen and the castor oil is a combination of oxidation and polymerization. This reaction is promoted by transition metals including iron, copper and manganese. Such polymerized castor oils are well known in the art and are discussed by F. Naughton, F. Duneczky, C. Swenson, T. Kroplinski and M. Cooperman in Kirk Othmer Encyclopedia of Chemical Technology, Vol. 5 (3 ed. 1979).

The use of polymerized castor oil promotes the flexibility and chemical resistance of the polyurethanes and also permits easier control of the crosslink density thereof.

The ricinoleic acid catalyst is physically mixed into the polyol component in an amount effective to reduce the gel and demold time as defined in the examples. Thus, while any effective catalytic amount may be employed it is preferred that such amount constitute from about 0.1 to about 30%, and preferably from about 0.1 to about 15%, by weight, based on the weight of the polyol. The acid catalyst is stable and substantially unreactive with the polyol at room temperature. This is a distinct advantage in that it can be added to the polyol immediately after or during (provided it is added under conditions, e.g., low temperaures, such that it will not react during polyol formation) its manufacture rather than on site where the polyurethane is employed in making the separatory devices.

The amount of polyol added to the prepolymer should be sufficient to react with the free isocyanate groups remaining thereon after its preparation but preferably not too low or too large an excess is used. Too low an amount of polyol may result in a cured system which is too hard while excess amounts may result in undesired plasticizer action. The particular amount of polyol required to react properly with the prepolymer can readily be determined by those skilled in the art by known calculations.

Accordingly, the NCO-terminated prepolymer is blended with the polyol at weight ratios of from about 10:90 to about 90:10, preferably from about 20:80 to about 70:30, and most preferably from about 30:70 to about 55:45 respectively in order to achieve an NCO/OH equivalent weight ratio of from about 0.9:1.4 and preferably about 1.0 to 1.1.

Hollow fibers which are adaptable to the catalyzed polyurethane potting material can be prepared from any of a wide variety of polymers well known in the art to be suitable for biomedical applications. Such fibers include those which are prepared from compounds which contain —OH, —NH$_2$, and =NH groups.

Representative examples of such compounds include cellulose, cellulose acetate, cellulose ethers, polyamides, polyacrylamides, polysulfones, polyesters, polycarbonates, polyurethanes, polysacchrides, and proteins in general, such as casein, collagen and the like. Preferred fibers include cellulose and cellulose acetate.

As described above, the sealing collar for hollow fiber separatory devices may be formed in a number of ways well known in the art. With the preferred method being centrifugal casting illustrated in U.S. Pat. No. 3,492,698.

Generally, hollow fibers are fabricated into a substantially parallel bundle of from about 1000 to 20,000 or more fibers by a number of methods. One such method is to wrap a fiber continuously end-to-end onto a mandrel rod with retaining brackets on either end. The substantially parallel fibers are then inserted into a holding device with end-molds as described in the aforementioned U.S. Pat. No. 3,492,698 relating to centrifugal casting.

The polyurethane forming compositions will typically be cured in two stages. In the first stage, referred to herein as the pre-cure, they are subjected to temperatures of from about 25 to about 75° C., and preferably from about 25 to about 50° C. The polyurethane composition is considered to be pre-cured when it has gelled to the point that it will not flow as determined by the gel test discussed in the Examples. The manner in which the resin is pre-cured can vary and will depend on the particular apparatus employed to make the hollow fiber separatory device.

For example, the holding device containing the fiber bundle is typically placed into a centrifuge-like device which incorporates a potting-material reservoir with tubes connecting it to the end-molds. The mixture of the polyol component containing the acid catalyst, and the NCO-terminated prepolymer can be mixed and placed into the potting reservoir wherein it is maintained at the above described pre-cure temperatures, and the entire assembly then rotated to provide a 2 to 200 g force nearly parallel to the fiber bundle. The resin is forced down the connecting tubes by the g force and flows around and among the fibers in the end-molds. The end molds can optionally also be heated to the above-described pre-cure temperatures. The process is continued until the reservoir is devoid of resin. Alternatively, the potting material can be placed into the holding device at room temperature and forced into the end molds which are heated to the above described precure temperatures.

The rotation is continued until the polyurethane is gelled, i.e., has set to a non-flowable state.

In the absence of the ricinoleic acid catalyst centrifuge times at room temperature pre-cures (e.g., 25° C.) would ordinarily be in the range of from about 1 to about 8 hours. The use of the catalyst permits a reduction in centrifuge times (i.e., gel or pre-cure times) to from about 10 to about 30 minutes, preferably from about 15 to about 25 minutes (e.g., 20 minutes) at the above described pre-curing temperatures. Higher pre-curing temperatures up to about 75° C. permit increasingly shorter centrifuge times. Room temperature pre-cures are preferred since this results in a substantial savings in energy consumption and cost by reducing the time during which the centrifuge is tied up for each batch of hollow fibers relative to that required in the absence of catalytic material.

After the polyurethane has pre-cured (i.e. gelled) the fiber bundle is removed and the unit placed in an oven for the second stage of curing referred to herein as post curing. Post curing temperatures can vary from about 25° C. to about 75° C., and preferably from about 45° to about 65° C. (e.g., 50° C.). Post curing times also referred to herein as demold times, can vary from about 1 to about 6 hours, and preferably from about 1.5 to about 3 hours (e.g., 2 hours) at the above described post curing temperatures. Post curing times are reduced by the presence of the catalyst but to a lesser extent than the observed reduction in centrifuge or gel times. However, post curing does not tie up the centrifuge and hence is not a rate limiting step in the overall process for preparing the separatory device.

Alternatively, pre-curing and post curing can be achieved in a single stage by permitting the resin to remain at room temperatures for a period of about 5 to about 14 days (e.g. 7 days).

The end-molds are then displaced and the potted fibers are opened by cutting through the sealing collar perpendicular to the fiber bundle. A bundle results wherein the potted end or ends demonstrate structural integrity and round, open fibers.

While the present disclosure is directed primarily to hollow fiber separatory devices which employ a polyurethane resin catalyzed with ricinoleic acid, the present invention also contemplates the use of the aforementioned catalyzed polyurethane composition in conjunction with the above described curing temperatures and times in any separatory device to be used in biomedical applications which requires the sealing of a separatory membrane in a non-toxic potting resin. The term separatory membrane as employed herein characterizes the configurations into which a substance can be provided to perform the function of selecting, filtering, or separating, one material from a medium containing the same and includes such configurations, in addition to hollow fibers, as films, screens, foams, sponges, and the like.

Such separatory devices include those which can be employed as blood transfusion filters such as depth filters, screen filters, and combination depth and screen filters. In the depth type filter, blood passing through the interstices of the filter is exposed to a large foreign surface, and microaggregates in the blood (e.g. platelets, white cells, and matted fibrin) are removed by adhesion to the filtering medium. Screen type filters effect filtration by sieving, i.e. by mechanically obstructing passage of particles larger than than the screen pore size. The combination type filters combine the filtration modes of both depth and screen filters. Representative separatory membranes which can be employed in such blood transfusion devices include those prepared from Dacron wool, polyester mesh, polyurethane sponge and foam, nylon wool and the like. Each of these separatory membranes can be secured in a filter housing using the catalyzed polyurethane resins described herein.

Another broad group of separatory devices employing separatory membranes which can be potted or sealed with the catalyzed polyurethanes described herein are those which employ permeable or selectively permeable films. The identity of the composition of such films is selected in accordance with well known requirements for their ability to perform an intended function such as blood oxygenation, kidney dialysis, and the like. Such devices typically comprise a plurality of membranes disposed in a spaced relationship in opposition to one another, e.g., in a substantially parallel, pleated, concentric or spiral surface-to-surface array, so as to define both a first group of flow volumes (e.g., to permit the flow of blood) and a second group of flow volumes (e.g. to permit the flow of a treating fluid). The members of the second group of flow volumes are disposed in alternating relationship with the members of the first group. Each flow volume contains membrane-spacing means (e.g., a woven screen) to support the membranes which define the two groups of flow volumes.

Means are provided for simultaneously defining the periphery of each of said flow volumes and for bonding together adjacent membrane assemblies, and the spacing means located therebetween to form gastight peripheral walls. In the present invention such means comprise the catalyzed polyurethane described herein. The techniques for employing the potting resin in such devices are well known in the art.

Means are also provided for separate access to and egress from the first and second group of flow volumes. The access and egress means, which typically take the form of discontinuous channels, place at least two adjacent flow volumes of the same group in flow communication. The entire assembly is located in, or defines, a housing with a feed inlet and a feed outlet in flow communication with the access and egress means, respectively, of each group of flow volumes.

Representative patents which illustrate such separatory devices include U.S. Pat. Nos. 3,879,293, 3,907,687 and 3,925,037 the disclosures of which are herein incorporated by reference.

The invention is additionally illustrated in connection with the following Example which is to be considered as illustrative of the present invention. It should be understood, however, that the invention is not limited to the specific details of the Example. All parts and percentages in the claims and in the remainder of the specification are by weight unless otherwise specified.

EXAMPLE

The following NCO-terminated prepolymers are prepared in the following manner.

Prepolymer A

A mixture of 204 grams of polyoxypropylene glycol having a number averge molecular weight of 400, 205 grams of castor oil, and 795 grams of diphenyl-methane 4,4'-diisocyanate (MDI) are charged to the reactor under nitrogen blanket and with agitation. The temperature is slowly raised to 75° C. and maintained at 70°–80° C. for 2 hours cooling when necessary. The resulting prepolymer has an NCO content of about 16.2% and a viscosity of about 6,000 cps as determined on a Brookfield viscometer.

Prepolymer B

In accordance with the procedure for preparing prepolymer A, a second prepolymer is prepared based upon: 204 grams of polyoxypropylene glycol having a molecular weight of 400, 205 grams of castor oil, 614 grams of diphenylmethane 4,4'-diisocyanate and 181 grams of 3-isocyanatomethyl-3, 5,5-trimethylcyclohexylisocyanate. The resulting prepolymer has an NCO content of 17.4% and a viscosity of about 4,000 cps.

Prepolymer C

In accordance with the procedure for preparing prepolymer A above, a third prepolymer is prepared based upon: 204 grams polyoxypropylene glycol having molecular weight of 400, 98 grams of castor oil, and 844 grams of MDI. The resulting prepolymer has an NCO content of 19.6% and a viscosity of about 4,500 cps.

Preparation of Polyol Component

A number of different polyol mixtures are prepared for reaction with one of the prepolymers A-C. The appropriate polyols and amounts thereof which are mixed for each of runs 1 to 13 are shown at Table I. The polyols which are chosen for each mixture are taken from ingredients 1 to 3. The weights of each polyol for each run identify which polyol is chosen for each mixture. Blanks in a particular run indicate the absence of the ingredient. The appropriate polyols for each run are mixed at 60° C. for one hour under a vacuum of at least 10 mm Hg. The temperature of each polyol mixture is allowed to cool to room temperature, e.g. 25° C.

Runs 1 to 4 serve as a control and consequently no acid is added to the polyol component before mixing with the prepolymer.

For runs 5 to 13, the polyol mixtures are further mixed after cooling with the appropriate amount of a particular acid selected from ingredients 4 to 6 as shown at Table I.

The mixing of the prepolymer and the polyol components for each run is conducted by hand mixing for one minute, and then degassing each sample for an additional minute at a pressure of 10 mm Hg.

Samples from each of the prepolymer/polyol mixtures of runs 1 to 4, and the prepolymer/polyol-acid mixtures of runs 5 to 13 are then subjected to a number of tests as shown at Table I.

When testing for toxicity by the hemolysis test the samples are allowed to cure for 7 days at room temperature i.e., 25° C.

Samples of the uncured polyurethane forming compositions of each run are tested for gel time at 25° C. using a 50 gram sample and for demold time.

The hemolysis test is conducted in accordance with the following procedure.

Five grams of each polyurethane sample cured as described above is covered with 10 ml of an aqueous solution of 0.9% sodium chloride, and heated at 70° C. for 24 hours. The eluate is decanted and the temperature adjusted to 37° C. Citrated human blood, 0.2 ml, is then added to 10 ml of the extract and the mixture heated at 37° C. ±1° C. for 1 hour. At the end of this period the sample test solutions are centrifuged for 10 minutes at approximately 590 g and the supernatant liquid is filtered through a 0.22 micron filter. The supernatant is then subjected to spectrophotometric analysis and the percent transmittance at 545 m$\mu$ is determined for each sample. A positive control is prepared for complete hemolysis by placing a 0.2 ml of the citrated blood in 10 ml of 0.1% sodium carbonate and mixing immediately. The reading obtained from the sodium carbonate-blood mixture in the spectrophotometer represents 100% hemolysis. A negative control for 0% hemolysis is obtained by mixing the blood and saline alone.

The optical density (OD) is then determined for each of the controls and each sample and the percent hemolysis is determined from the following equation:

$$\% \text{ Hemolysis} = \frac{OD \text{ of test sample} - OD \text{ of negative control}}{OD \text{ of positive control}} \times 100$$

Each sample is judged to fail the hemolysis test when the hemolysis is equal to or greater than 5%.

The gel time (i.e., dry stick gel time) is determined in accordance with ASTM D2471 and is measured from a point immediately after mixing the two components.

The demold time is measured as the time from the point of mixing the two components to the point at which the polyurethane can be removed from a polypropylene beaker and will not deform, is relatively tack-free and has a Shore A durometer of about 70.

As may be seen from the data of Table 1 the samples obtained from runs 11 to 13, which employ ricinoleic acid all pass the hemolysis test while those samples obtained from runs 5 through 10 fail the hemolysis test. Moreover, the gel time and demold times of these runs are substantially reduced in comparison to the controls.

TABLE I

| Ingredient No. | Run No. | 1 | 2 | 3 | 4 | 5 | 6 | 7 | 8 | 9 | 10 | 11 | 12 | 13 |
|---|---|---|---|---|---|---|---|---|---|---|---|---|---|---|
| (1) | TMP Diricinoleate | — | — | 70.0 | 70.0 | 68.0 | 68.2 | 68.2 | 68.2 | — | — | 61.6 | — | — |

TABLE I-continued

| Ingredient No. | Run No. | 1 | 2 | 3 | 4 | 5 | 6 | 7 | 8 | 9 | 10 | 11 | 12 | 13 |
|---|---|---|---|---|---|---|---|---|---|---|---|---|---|---|
| (2) | Ethylene Glycol Mono Ricinoleate (gms) | 71.1 | 71.1 | 30.0 | 30.0 | 29.0 | 28.8 | 28.8 | 28.8 | 69.7 | 69.0 | 26.4 | 62.6 | 62.6 |
| (3) | Polymerized C.O. (gms) | 28.9 | 28.9 | — | — | — | — | — | — | 28.3 | 29.6 | — | 25.4 | 25.4 |
| (4) | Ricinoleic Acid (gms) | — | — | — | — | — | — | — | — | — | — | 12.0 | 12.0 | 12.0 |
| (5) | Azelaic Acid (gms) | — | — | — | — | — | 3.0 | 3.0 | 3.0 | 2.0 | 1.4 | — | — | — |
| (6) | Dihydroxy Benzoic Acid (gms) | — | — | — | — | 3.0 | — | — | — | — | — | — | — | — |
| (7) | Prepolymer A (gms) | 111.9 | — | 106.6 | — | — | 111.4 | — | — | 115.1 | — | — | 118.3 | — |
| (8) | Prepolymer B (gms) | — | 99.6 | — | 94.9 | — | — | 98.8 | — | — | — | 98.6 | — | 104.9 |
| (9) | Prepolymer C (gms) | — | — | — | — | 96.0 | — | — | 96.1 | — | 102.4 | — | — | — |
| | % Hemolysis/Pass Fail | 0.33/p | 0.33/p | 0.33/p | 0.33/p | 11.61/f | 37.66/f | 15.29/f | 45.88/6 | 21.03/f | 95.47/f | 0.36/p | 0.36/p | 0.90/p |
| | Gel Time 50 gm. Sample, 25° C. (min.) | 90 | 95 | 87 | 92 | 19 | 30 | 40 | 47 | 28 | 31 | 20 | 13 | 22 |
| | Demold Time (min.) | 480 | 480 | 480 | 480 | 170 | 80 | 280 | 360 | 115 | 244 | 210 | 90 | 260 |

TMP = Trimethylolpropane
Polymerized C.O. = Castor oil which has been heated to 300° F. for a period sufficient to observe the color thereof to darken and then lighten, cooled to 200° F. and maintained thereat for 14 hrs. while bubbling air therethrough.
p = pass
f = fail The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. In a two component polyurethane forming composition which is non-toxic when cured and employed as a potting agent in a separatory device capable of use in a biomedical application wherein the first component comprises at least one NCO-terminated prepolymer and the second component comprises at least one polyol, wherein the improvement comprises including an effective catalytic amount of unreacted ricinoleic acid into said second component prior to curing above that amount of ricinoleic acid inherently present in the polyol.

2. The polyurethane forming composition of claim 1 wherein (1) the NCO-terminated prepolymer is the reaction product of (a) at least one polyol selected from the group consisting of polyol esters, polyether polyols and castor oil, and (b) at least one polyfunctional isocyanate selected from the group consisting of aromatic diisocyanates, aromatic triisocyanates, and aliphatic diisocyanates; (2) the polyol of the second component is selected from at least one member of the group consisting of polyether polyols, polyol esters, and castor oil; (3) the unreacted ricinoleic acid catalyst is mixed with the second component in an amount of from about 0.1 to about 30%, by weight, based on the weight of the second component; and (4) the NCO-terminated prepolymer and the polyol is reacted at a weight ratio of from about 10:90 to about 90:10.

3. The composition of claim 1 wherein the NCO-terminated prepolymer of the first component is the reaction product of a mixture of polyoxypropylene glycol and castor oil with at least one isocyanate selected from the group consisting of (1) diphenylmethane 4,4'-diisocyanate, and (2) mixtures of diphenylmethane 4,4'-diisocyanate and 3-isocyanatomethyl-3,5,5-trimethylcyclohexylisocyanate and the second polyol component is selected from the group consisting of (1) mixtures of trimethylol propane diricinoleate and ethylene glycol monoricinoleate and (2) mixtures of ethylene glycol monoricinoleate and polymerized castor oil and wherein the rininoleic acid catalyst is mixed with the polyol component in an amount of from about 0.1 to about 15% by weight based on the weight of the polyol of the second component.

4. In a process for preparing a separatory device capable of use in a biomedical application wherein a portion of at least one separatory membrane is secured in a housing using a non-toxic cured polyurethane composition provided by reacting a first component comprising at least one NCO-terminated prepolymer with a second component comprising at least one polyol, wherein the improvement comprises reacting said NCO-terminated prepolymer of the first component with said polyol of the second component in the presence of an added effective catalytic amount of ricinoleic acid.

5. The process of claim 4 wherein (1) the NCO-terminated prepolymer is the reaction product of (a) at least one polyol selected from the group consisting of polyol esters, polyether polyols, and castor oil, and (b) at least one polyfunctional isocyanate selected from the group consisting of aromatic diisocyanates, aromatic triisocyanates, and aliphatic diisocyanates; (2) the polyol component is selected from at least one member of the group consisting of polyether polyols, polyol esters, and castor oil; (3) the ricinoleic acid catalyst is mixed with the polyol component prior to reaction with the NCO-terminated prepolymer in an amount of from about 0.1 to about 30%, by weight, based on the weight of the polyol, and (4) said reaction is conducted at a pre-cure temperature of from about 25° to about 75° C.

6. The process of claim 5 wherein the NCO-terminated prepolymer of the first component is the reaction product of a mixture of polyoxypropylene glycol and castor oil with at least one isocyanate selected from the group consisting of (1) diphenylmethane 4,4'-diisocyanate, and (2) mixtures of diphenylmethane 4,4'-diisocyanate and 3-isocyanatomethyl3,5,5-trimethylcyclohexyloisocyanate and the second polyol component is selected from the group consisting of (1) mixtures of trimethylol propane diricinoleate and ethylene glycol monoricinoleate and (2) mixtures of ethylene glycol monoricinoleate and polymerized castor oil and wherein the ricinoleic acid catalyst is mixed with the polyol component in an amount of from about 0.1 to about 15% by weight based on the weight of the polyol of the second component.

7. In a separatory device capable of use in biomedical applications wherein at least one separatory membrane is secured in a housing in a manner sufficient to perform the selected biomedical function using a non-toxic cured polyurethane composition provided by reacting a first component comprising an NCO-terminated prepolymer with a second component comprising at least one polyol, wherein the improvement comprises using as the non-toxic polyurethane composition at least one of said NCO-terminated prepolymers of the first component reacted with at least one of said polyols of the second component in the presence of an added effective catalytic amount of ricinoleic acid.

8. The separatory device of claim 7 wherein the separatory membrane comprises an assembly of a plurality of permeable continuously hollow fibers whose open terminal portions are potted in a non-toxic sealing collar of said catalyzed cured polyurethane composition, wherein the open terminal portions of the fibers extend through the sealing collar, the resulting potted assembly being sealed within a casing to form a separatory cell having fluid ports which allow for the passage of a first fluid through the lumen of the hollow fibers and a second fluid around and in contact with the outside of the hollow fibers, said sealing collar acting as a non-toxic means for isolating the flow of said first and second fluids from one another.

9. The separatory device of claim 7 wherein (a) a plurality of separatory membrane assemblies are disposed in a spaced relationship in opposition to one another in a surface-to-surface array selected from the group consisting of parallel, pleated, concentic and spiral, to define both a first group of flow volumes and a second group of flow volumes alternating between said first group; (b) spacing means for the membrane assemblies are located in each of said flow volumes; (c) said non-toxic catalyzed cured polyurethane composition is employed for simultaneously defining the periphery of each of said flow volumes and for bonding together adjacent membrane assemblies and the spacing means located therebetween to form gastight peripheral walls; and (d) means are provided for separate access to, and egress from, the plurality of flow volumes in said first and second group of volumes said means placing at least two adjacent flow volumes of the same group in flow communication.

10. The separatory device of any one of claims 7 to 9 wherein (1) the NCO-terminated prepolymer is the reaction product of (a) at least one polyol selected from the group consisting of polyol esters, polyether polyols, and castor oil, and (b) at least one polyfunctional isocyanate selected from the group consisting of aromatic diisocyanates, aromatic triisocyanates, and aliphatic diisocyanates; (2) the polyol of the second component is selected from at least one member of the group consisting of polyether polyols, polyol esters, and castor oil; (3) the ricinoleic acid catalyst is mixed with the second component in an amount of from about 0.1 to about 30%, by weight, based on the weight of the second component; and (4) the NCO-terminated prepolymer and the polyol is reacted at a weight ratio of from about 10:90 to about 90:30.

11. The separatory device of any one of claims 7 to 9 wherein the NCO-terminated prepolymer is the reaction produce of a mixture of polyoxypropylene glycol and castor oil with at least one isocyanate selected from the group consisting of (1) diphenylmethane 4,4'-diisocyanate, and (2) mixtures of diphenylmethane 4,4'-diisocyanate and 3-isocyanatomethyl-3,5,5-trimethylcyclohexylisocyanate and the second polyol component is selected from the group consisting of (1) mixtures of trimethylol propane diricinoleate and ethylene glycol monoricinoleate and (2) mixtures of ethylene glycol monoricinoleate and polymerized castor oil and wherein the ricinoleic acid catalyst is mixed with the polyol component in an amount of from about 0.1 to about 15% by weight based on the weight of the polyol of the second component.

* * * * *

UNITED STATES PATENT OFFICE
CERTIFICATE OF CORRECTION

Patent No. 4,256,617　　　　　　　　Dated March 17, 1981

Inventor(s) Thaddeus F. Kroplinski and Barton C. Case

It is certified that error appears in the above-identified patent and that said Letters Patent are hereby corrected as shown below:

Claim 9, line 45 - "concentic" should read --concentric--.

Claim 11, line 32 - "produce" should read --product--.

Signed and Sealed this

Ninth Day of June 1981

[SEAL]

Attest:

RENE D. TEGTMEYER

*Attesting Officer*　　*Acting Commissioner of Patents and Trademarks*